(12) United States Patent
Bagnasco et al.

(10) Patent No.: US 6,622,691 B2
(45) Date of Patent: Sep. 23, 2003

(54) CONTROL METHOD FOR A DIRECT INJECTION GAS ENGINE WITH FUEL VAPOR PURGING

(75) Inventors: Andrew P. Bagnasco, Plymouth, MI (US); Michael J. Steckler, Highland, MI (US); Sergio Quelhas, Ann Arbour, MI (US); Derk Geurts, Redange (LU)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/950,283

(22) Filed: Sep. 10, 2001

(65) Prior Publication Data

US 2003/0047161 A1 Mar. 13, 2003

(51) Int. Cl.[7] .................................. F02B 17/00
(52) U.S. Cl. .................. 123/295; 123/698; 123/520
(58) Field of Search .................... 123/295–299, 123/520, 698, 387, 394, 704, 700

(56) References Cited

U.S. PATENT DOCUMENTS 5,596,972 A * 1/1997 Sultan et al. ............... 123/520

6,176,228 B1 * 1/2001 Kerns ....................... 123/698

* cited by examiner

Primary Examiner—Hieu T. Vo
Assistant Examiner—Johnny H. Hoang
(74) Attorney, Agent, or Firm—Jimmy L. Funke

(57) ABSTRACT

A control method for a direct injection gasoline engine operable in stratified or homogenous combustion modes and having a fuel vapor purge system estimates the hydrocarbon concentration of purge vapor during open loop fuel control in the stratified combustion mode, and controls the fuel injection quantity and the combustion mode based on the estimated concentration. The hydrocarbon concentration of the purge vapor is estimated during open-loop fuel control by measuring the air/fuel ratio error during steady state operation with no fuel vapor purging, and using such air/fuel ratio error to normalize the air/fuel error observed during steady state operation with purge control. The fuel injection quantity is compensated for the estimated purge vapor concentration, and engine combustion mode is determined in part based on a comparison of the estimated concentration with a calibrated threshold.

10 Claims, 5 Drawing Sheets

CONTROL METHOD FOR A DIRECT INJECTION GAS ENGINE WITH FUEL VAPOR PURGING

TECHNICAL FIELD

The present invention is directed to a method of operation for a direct injection gasoline engine including a fuel vapor purge system, and more particularly to a method of controlling the engine combustion mode and fuel supply based on an estimate of the hydrocarbon concentration of the purge vapor.

BACKGROUND OF THE INVENTION

A direct injection gasoline engine may be operated in either homogeneous or stratified combustion modes, depending on the fuel injection timing relative to the engine cycle. In the homogeneous combustion mode, fuel is injected during the intake stroke of a four-stroke cycle so that the air/fuel mixture is evenly distributed throughout the cylinder when the mixture is ignited during the combustion stroke; while operating in this mode, a closed-loop control of fuel is executed to maintain the air/fuel ratio at a desired value, such as the stoichiometric ratio. In the stratified combustion mode, fuel is injected during the combustion stroke, resulting in a rich air/fuel mixture in the vicinity of the spark plug at ignition, even though the overall air/fuel ratio in the cylinder may be significantly leaner than the stoichiometric ratio; while operating in this mode, closed-loop fuel control is suspended, and an open-loop fuel control is executed instead.

Storage of fuel tank vapors is essential for the control of evaporative emissions, and in the usual system, the stored fuel vapor is periodically purged into the intake manifold of the engine for delivery into the engine cylinders along with the intake air. However, the purged fuel vapor may constitute a significant percentage of the overall fuel requirement, and the fuel injection quantity must be adjusted accordingly to maintain accurate control of the air/fuel ratio. When an engine is operated in a homogeneous combustion mode engine with closed-loop fuel control, the hydrocarbon concentration of the purge fuel vapor may be estimated during the periodic purging based on the feedback signal of the closed-loop exhaust gas oxygen sensor, and then used to suitably adjust the fuel injection quantity; see for example, the co-pending U.S. patent application Ser. No. 09/264,524, (Attorney Docket No. H-203439), filed on Mar. 8, 1999, assigned to the assignee of the present invention, and incorporated by reference herein. However, the disclosed approach cannot be used to estimate the purge vapor concentration during open-loop fuel control in a stratified combustion mode. Also, it is difficult to effectively purge stored fuel vapor while operating in the stratified combustion mode because the intake manifold pressure is significantly increased during stratified combustion, and the vapor that is successfully purged tends to burn incompletely. Accordingly, what is needed is a control method for a direct injection gasoline engine that regulates engine operation to efficiently purge stored fuel vapors while maintaining accurate fuel injection control during purging.

SUMMARY OF THE INVENTION

The present invention is directed to an improved control method for a direct injection gasoline engine operable in stratified or homogenous combustion modes and having a fuel vapor purge system, wherein the hydrocarbon concentration of purge vapor is estimated during open loop fuel control in the stratified combustion mode, and wherein the fuel injection quantity and the combustion mode are controlled based on the estimated concentration. The hydrocarbon concentration of the purge vapor is estimated during open-loop fuel control by measuring the air/fuel ratio error during steady state operation with no fuel vapor purging, and using the measured steady state air/fuel ratio error to normalize the air/fuel ratio error observed during steady state operation with purge control. The fuel injection quantity is compensated for the estimated purge vapor concentration, and engine combustion mode is determined in part based on a comparison of the estimated concentration with a calibrated threshold. Additionally, a limit on the percentage of purge vapor is determined as a function of combustion mode, and the flow rate is controlled based on the degree to which the percentage of purge vapor exceeds the determined limit.

BRIEF DESCRIPTION OF THE DRAWINGS

FIG. 2 depicts a main flow diagram, FIG. 3 details a portion of the main flow diagram concerning purge duty cycle control, FIG. 4 details a portion of the main flow diagram concerning selection of engine combustion mode, and FIG. 5 details a portion of the main flow diagram concerning estimation of the purge vapor concentration.

DESCRIPTION OF THE PREFERRED EMBODIMENT

Figure 1:
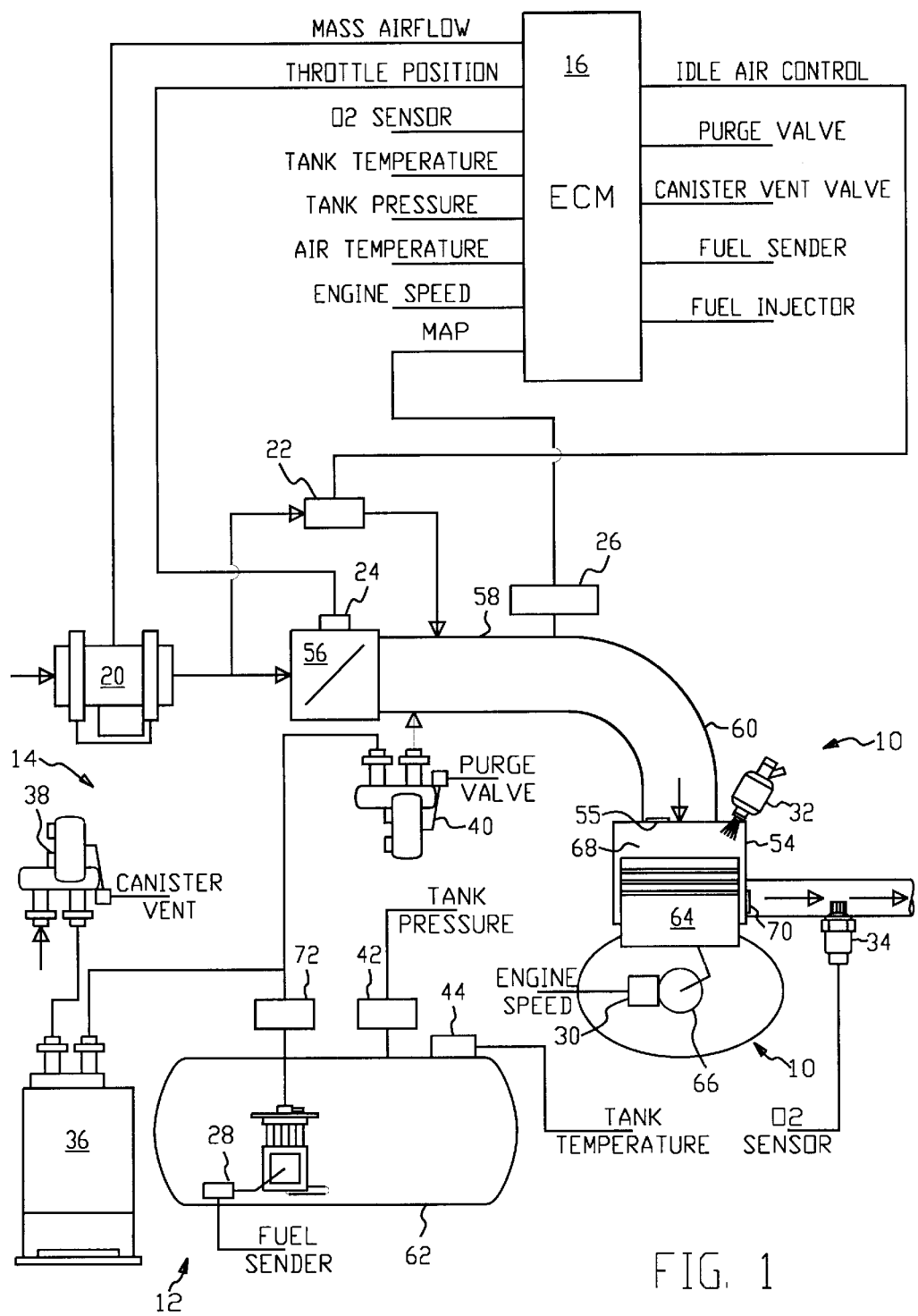
FIG. 1 is a system diagram of a direct injection gasoline engine and control system including a microprocessor-based control unit and an evaporative emission system including a canister purge mechanism operated by the control unit.

The present invention is disclosed in the context of a control system for a direct injection gasoline engine generally designated by the reference numeral 10. The control system includes a fuel control system 12 and an evaporative emission control system (EECS) 14, both of which are controlled by a microprocessor-based engine control module (ECM) 16. In general, the EECS 14 manages evaporative emissions by storing fuel vapor and periodically releasing all or a portion of the stored vapor to engine 10 for combustion therein, and the fuel control system 12 injects a determined amount of fuel into engine 10, taking into account any fuel vapor supplied by EECS 14. In the illustrated embodiment, the fuel injection system 12 includes a mass airflow (MAF) sensor 20, and idle air control valve 22, a throttle position sensor 24, a manifold absolute pressure (MAP) sensor 26, a fuel sender 28, an engine speed sensor 30, a number of electrically activated fuel injectors 32, and a wide-range air/fuel (WRAF) exhaust gas sensor 34. The EECS 14 primarily includes a charcoal canister 36, electrically operated canister vent and purge valves 38, 40, and fuel tank pressure and temperature sensors 42, 44.

The ECM 16 executes a number of software routines for regulating the operation of the EECS 14 and the fuel control system 12, including functions such as fuel quantity calculations, fuel injection control, and fuel vapor purge control. Thus, ECM 16 receives output signals from the above-mentioned sensors 20, 24, 26, 28, 30, 34, 42, 44, and develops outputs signals for controlling idle air control valve 22, fuel injector 32, canister vent valve 38 and purge valve 40.

The fuel injectors 32 inject fuel directly into respective engine cylinders 54, as shown, and one or more intake valves 55 at each cylinder 54 open during an intake stroke to admit intake air and purged fuel vapor, if any. The intake air is ingested through a throttle valve 56, and an intake manifold 58 to which the various cylinders 54 are coupled by respective intake runners 60. The idle air valve 22 provides a by-pass around throttle valve 56, and its restriction is controlled by ECM 16 for purposes of regulating the engine idle speed. A piston 64 reciprocally disposed in each cylinder 54 and coupled to a rotary crankshaft 66 defines a combustion chamber 68 into which the fuel is injected. Following ignition of the air/fuel mixture by a spark plug (not shown), the products of combustion (that is, the exhaust gasses) exit the cylinder 54 through an exhaust valve 70 past WRAF sensor 34 to a catalytic converter and exhaust pipe (not shown). Operation of the engine 10 creates a sub-atmospheric pressure, or vacuum, in intake manifold 58, and the vacuum draws stored fuel vapor from canister 36 into intake manifold 58 through purge valve 40 as fresh air is drawn into canister 36 via vent valve 38. The fuel vapor stored in canister 36 originates in fuel tank 62, and is supplied to canister 36 via a rollover valve 72.

The ECM 16 controls the purge and vent valves 38, 40 so that the purge vapor flow is a desired percentage of the engine airflow. This desired percentage, referred to herein as PURGE_PCT_LMT, is ordinarily varied as a function of engine speed and load, and according to this invention, is also varied based on the engine combustion mode. The combustion mode dependence of PURGE_PCT_LMT takes into account the fact that purge vapors burn more efficiently in the homogeneous combustion mode than in the stratified combustion mode.

Since the injectors 32 inject fuel directly into the respective combustion chambers 68, the engine 10 may be operated either homogeneous or stratified combustion modes, depending on the timing of the fuel injection relative to the position of piston 64 in the engine cycle. In the homogeneous combustion mode, the ECM 16 activates injectors 32 while the respective intake valve 55 is open so that the air/fuel mixture is evenly distributed throughout the cylinder 54 when the mixture is ignited during the ensuing combustion stroke. In the stratified combustion mode, on the other hand, the ECM 16 activates injectors 32 just prior to the ignition event, resulting in a rich air/fuel mixture in the vicinity of the spark plug at ignition, even though the overall air/fuel ratio in the cylinder is controlled to a very lean ratio. In general, the homogeneous combustion mode is utilized primarily during medium to heavy engine load conditions, while the stratified combustion mode is utilized primarily during light engine load conditions.

In the homogeneous combustion mode, the ECM 16 executes a closed-loop control of the injected fuel to maintain the air/fuel ratio at a desired value, and purged fuel vapors delivered to intake manifold 58 burn very efficiently, provided the quantity of injected fuel is adjusted to take the purged fuel vapor into account. In this regard, the aforementioned U.S. patent application Ser. No. 09/264,524, discloses a technique for utilizing the air/fuel ratio feedback signal developed by an exhaust gas oxygen sensor during purging to estimate the hydrocarbon concentration of the purged fuel vapor for purposes of suitably adjusting the quantity of injected fuel. Specifically, the purge vapor concentration is estimated by an iterative process in which the estimate is incrementally increased or decreased during purge control if an integral of the measured air/fuel ratio error reaches respective rich or lean thresholds. When fuel vapor is not being purged, a conventional control utilizes the integral of the measured air/fuel ratio error to update a closed-loop adaptive learning table.

In the stratified combustion mode, the ECM 16 adjusts the injected fuel quantity open-loop to achieve a commanded engine torque output (or indicated mean effective pressure), and the throttle valve 56 is adjusted to maintain the air/fuel ratio approximately at a desired value significantly higher than the stoichiometric ratio. Under these conditions, the hydrocarbon concentration of the purge vapor cannot be estimated as disclosed in the aforementioned U.S. patent application Ser. No. 09/264,524 due to the sometimes substantial error between the actual and desired air/fuel ratio, even under steady-state operating conditions. Accordingly, a significant aspect of the present invention resides in a technique for estimating the hydrocarbon concentration of purge vapor while operating in the stratified combustion mode; the estimated concentration is used to suitably adjust the injected fuel quantity, and also to control the purge flow rate and select the combustion mode for engine 10 so as to assure efficient combustion of purged fuel vapors.

The flow diagrams of FIGS. 2–5 depict a software routine periodically executed by ECM 16 for carrying out a vapor purge and fuel injection control according to this invention. The blocks 80 and 82 are first executed to control activation of the electrically operated valves 38, 40 of EECS 14, and to select the combustion mode for engine 10 according to this invention. The steps involved in the purge control are illustrated in the flow diagram of FIG. 3, and the steps involved in selection of the combustion mode are illustrated in the flow diagram of FIG. 4.

If the homogeneous combustion mode is selected, the blocks 84–96 are executed substantially as described in the aforementioned U.S. Ser. No. 09/264,524 to determine the fuel injection quantity and update the purge concentration PURGE_CONC or block learn memory (BLM) tables. The base fuel per cylinder (BFPC) is determined at block 84 with a fully conventional closed-loop process based on a number of measured parameters such as MAP and TPS, the air/fuel ratio error AFR_ERROR determined from WRAF sensor output, and any adaptive corrections contained in the BLM. The block 86 then determines the quantity of fuel to be injected, taking into account the presence of purge vapors, if any. Thus, the determination of block 86 involves determining if vapor purging is active (as indicated by the status of the PURGE FLAG), and if so, suitably adjusting the BFPC value determined at block 84. The adjustment of BFPC for purge vapor involves determining what percentage (PURGE_PCT) of BFPC is supplied by the purge vapor, and correspondingly reducing BFPC. The percentage PURGE_PCT in turn, is determined based on an estimate PURGE_CONC of the hydrocarbon concentration of the purge vapor (discussed below in reference to block 94), as follows:

$$PURGE\_PCT = (PURGE\_CONC * MFRpurge * AFR)/MFRintake \quad (1)$$

where AFR is the target air/fuel ratio, and MFRpurge and MFRintake are mass flow rates of the purge vapor and the intake air. The quantities MFRpurge and MFRintake may be measured or estimated based on various factors, as disclosed for example, in the U.S. Pat. No. 5,845,627, issued on Dec. 8, 1998, and incorporated herein by reference. The fuel to be injected per cylinder IFPC may then be determined as follows:

$$IFPC = BFPC(1 - PURGE\_PCT) \quad (2)$$

The injection of the quantity IFPC is then scheduled at block 88 for the proper timing relative to the engine cycle, and following combustion, the air/fuel ratio error (AFR_ERROR) is determined based on the output of WRAF sensor 34 and the desired air/fuel ratio. The block 92 then checks the PURGE FLAG to determine if vapor purging is active. If vapor purging is active, the block 94 is executed to update PURGE_CONC as a function of the integral of the air/fuel ratio error (AFR_ERROR_INT); otherwise, the block 96 is executed to update the BLM as a function of AFR_ERROR_INT. Both blocks 94 and 96 involve determining if the magnitude of AFR_ERROR_INT exceeds a threshold, and if so, incrementally increasing or decreasing PURGE_CONC. For example, if vapor purging is active and AFR_ERROR_INT indicates a rich fuel error in excess of the threshold, PURGE_CONC is incrementally increased, which results in the appropriate adjustment of fuel injection amount when the blocks 84 and 86 are next executed.

If the stratified combustion mode is selected at block 82, the blocks 98–108 are executed as described below to determine the fuel injection quantity IFPC and update PURGE_CONC according to this invention. The base fuel per cylinder (BFPC) is determined at block 98 with a conventional open-loop process based on a number of measured parameters in order to produce a commanded engine torque. The block 100 then determines a purge combustion efficiency factor PURGE_EFF_FACTOR for adjusting BFPC to compensate for loss of engine torque output due to inefficient combustion of purge vapors. If vapor purging is active, PURGE_EFF_FACTOR is determined by table look-up as a function of the delivered air/fuel ratio AFR. In general, empirical testing has shown that the purge vapor combustion efficiency decreases with increasing values of AFR, and PURGE_EFF_FACTOR is essentially a normalized indication of such efficiency. The block 102 then determines the injected fuel per cylinder IFPC. If vapor purging is active (as indicated by the status of the PURGE FLAG), the BFPC value determined at block 98 is adjusted as a function of PURGE_PCT, and PURGE_EFF_FACTOR as follows:

$$IFPC=BFPC[1-(PURGE\_PCT*PURGE\_EFF\_FACTOR)] \qquad (3)$$

The injection of the quantity IFPC is then scheduled at block 104 for the proper timing relative to the engine cycle, and following combustion, the air/fuel ratio error AFR_ERROR is determined based on the output of WRAF sensor 34. The block 92 is then executed to update PURGE_CONC according to this invention as described below in reference to the flow diagram of FIG. 5.

Figure 2:
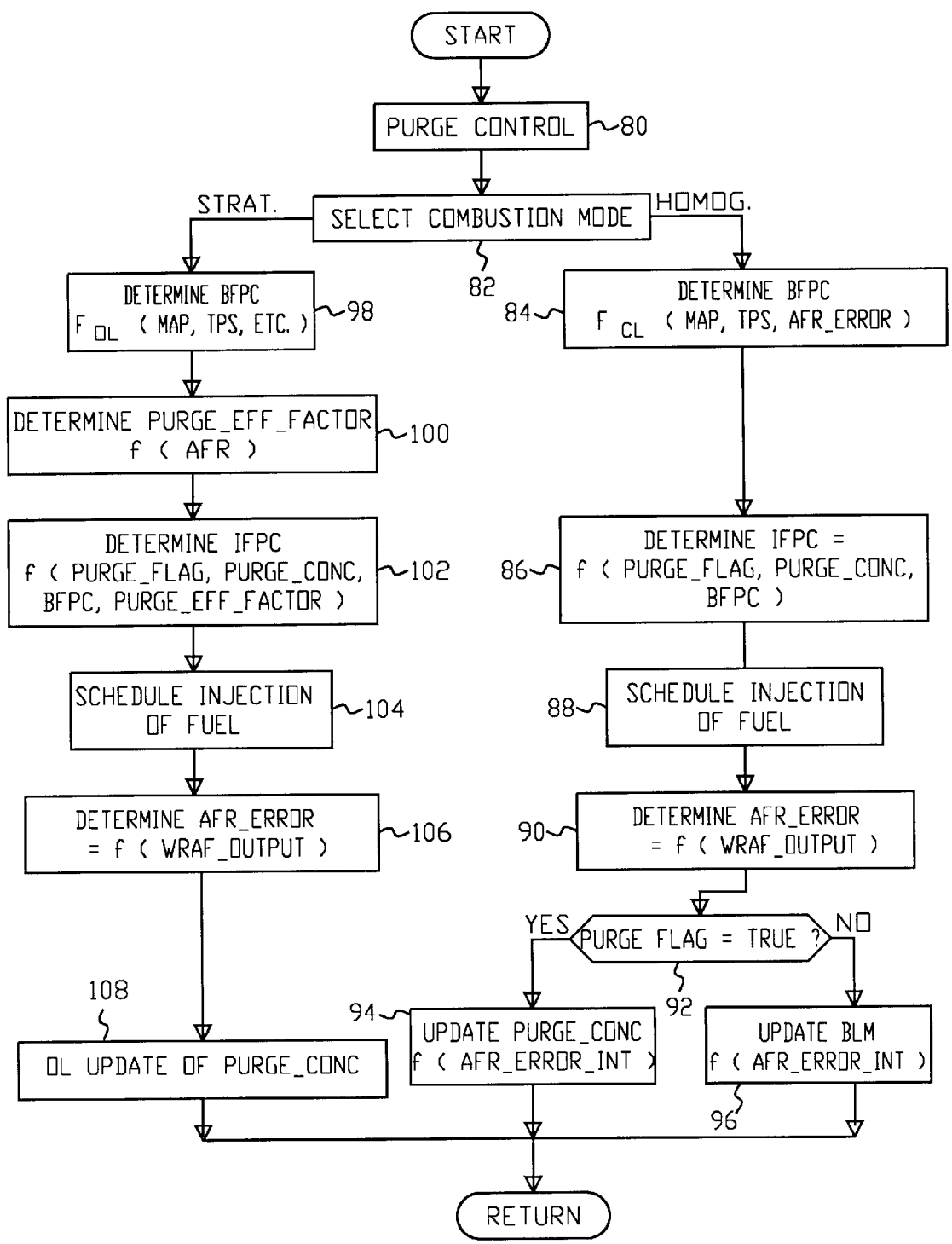
FIGS. 2–5 are flow diagrams depicting a software routine executed by the control unit of FIG. 1 in carrying out the control of this invention.
Figure 3:
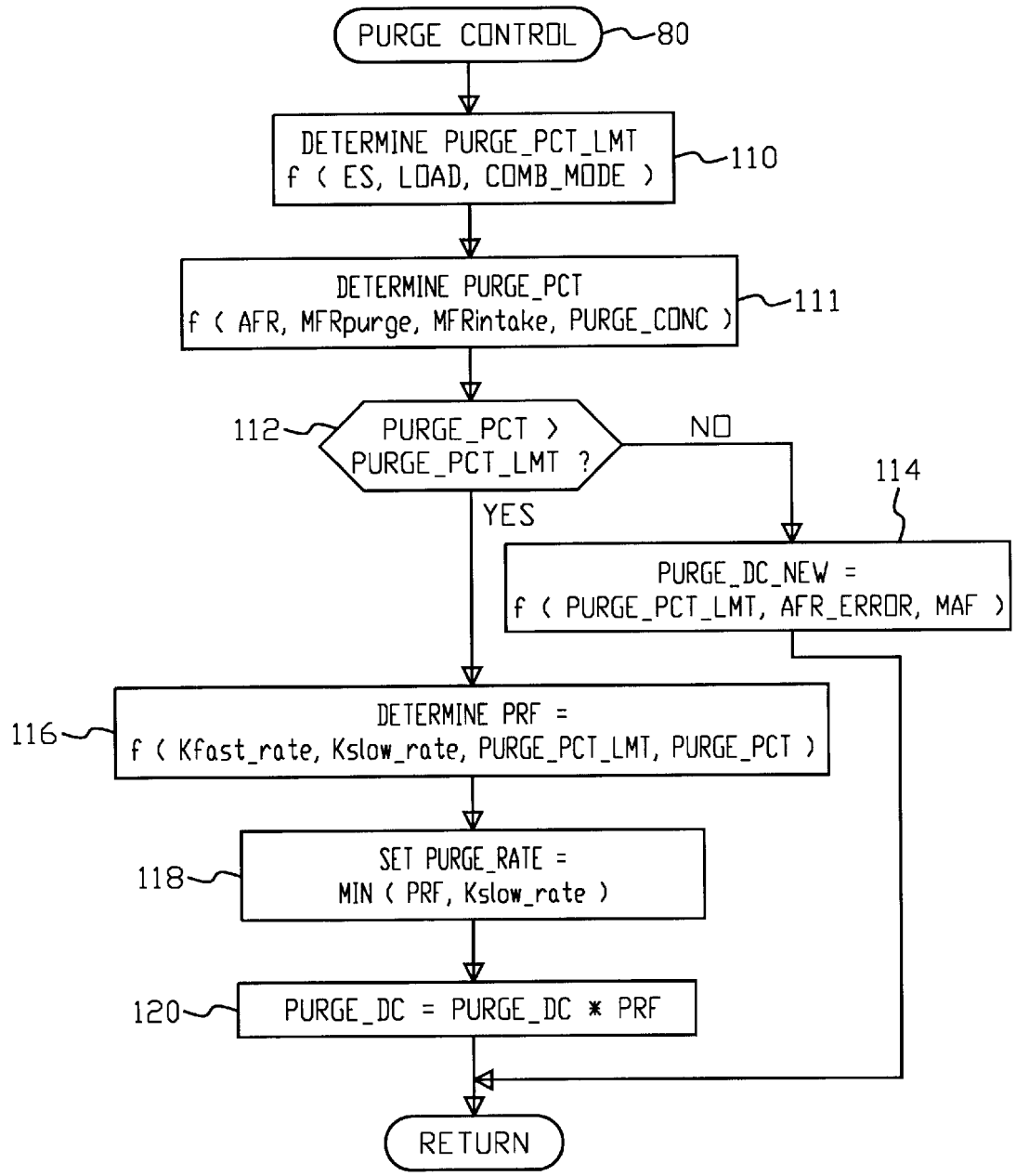

The flow diagram of FIG. 3 details the purge control block 80 of FIG. 2, and involves determining a control signal for activating the purge valve 40 to produce a desired flow of purge vapor. In the illustrated embodiment, this involves determining a desired percentage of purge vapor (PURGE_PCT_LMT) based on engine speed and load (ES, LOAD) and the selected combustion mode (COMB_MODE) as indicated at block 110, and then determining a PWM duty cycle (PURGE_DC) based on the deviation of the current purge vapor percent (PURGE_PCT) from PURGE_PCT_LMT. The dependency of PURGE_PCT_LMT on COMB_MODE reflects the fact that purge vapors will burn much more efficiently in the homogenous combustion mode than in the stratified mode; accordingly, PURGE_PCT_LMT can be scheduled for maximizing combustion of purge vapor. The current purge vapor percent, PURGE_PCT, is determined at block 111 as a function of the air/fuel ratio (AFR), the purge vapor mass flow rate (MFRpurge), the intake mass flow rate (MFRintake) and the estimated hydrocarbon concentration PURGE_CONC of the purge vapor, as given above in equation (1). If PURGE_PCT is less than or equal to PURGE_PCT_LMT, as determined at block 112, the block 114 sets the duty cycle PURGE_DC_NEW to a value based on PURGE_PCT_LMT, the air/fuel ratio error AFR_ERROR, and the measured mass air flow MAF. If AFR_ERROR is reasonably low, the duty cycle PURGE_DC is adjusted to achieve PURGE_PCT_LMT; however, PURGE_DC is controlled to achieve a value less than PURGE_PCT_LMT if AFR_ERROR indicates that there is significant fueling error. If PURGE_PCT is greater than PURGE_PCT_LMT, the blocks 116, 118 and 120 are executed to ramp down PURGE_DC at a determined rate. The blocks 116 and 118 determine a ramp factor PRF, and block 120 sets PURGE_DC equal to the product of PURGE_DC and PRF. The value of PRF computed at block 116 according to the expression:

$$PRF=(Kfast\_rate*PURGE\_PCT\_LMT/PURGE\_PCT)+[(1-Kfast\_rate)*Kslow\_rate] \qquad (4)$$

where Kfast_rate and Kslow_rate are calibrated values corresponding to the predetermined changes per unit time in the value of PURGE_DC. For example, Kfast_rate may be 0.60, corresponding to a 40% reduction of PURGE_DC each time block 120 is executed, and Kslow_rate may be 0.95, corresponding to a 5% reduction of PURGE_DC each time block 120 is executed. Thus, if PURGE_PCT is only slightly higher than PURGE_PCT_LMT, as may occur in normal purge control, PRF will be approximately equal to Kslow_rate. On the other hand, if PURGE_PCT is significantly higher than PURGE_PCT_LMT, as may occur when the combustion mode switches from homogeneous to stratified, the product [Kfast_rate*(PURGE_PCT_LMT/PURGE_PCT)] becomes smaller, resulting in a smaller value of PRF and a faster reduction of PURGE_DC. The block 118 sets the purge rate factor PRF equal to the lower of the PRF value computed at block 116 and Kslow_rate, and block 120 sets PURGE_DC equal to the product (PURGE_DC*PRF). Thus, when the combustion mode switches from homogeneous to stratified, resulting in an abrupt reduction in PURGE_PCT_LMT, the blocks 116–120 produce an initially fast reduction of PURGE_DC that falls exponentially to Kslow_rate as PURGE_PCT approaches PURGE_PCT_LMT.

Figure 4:
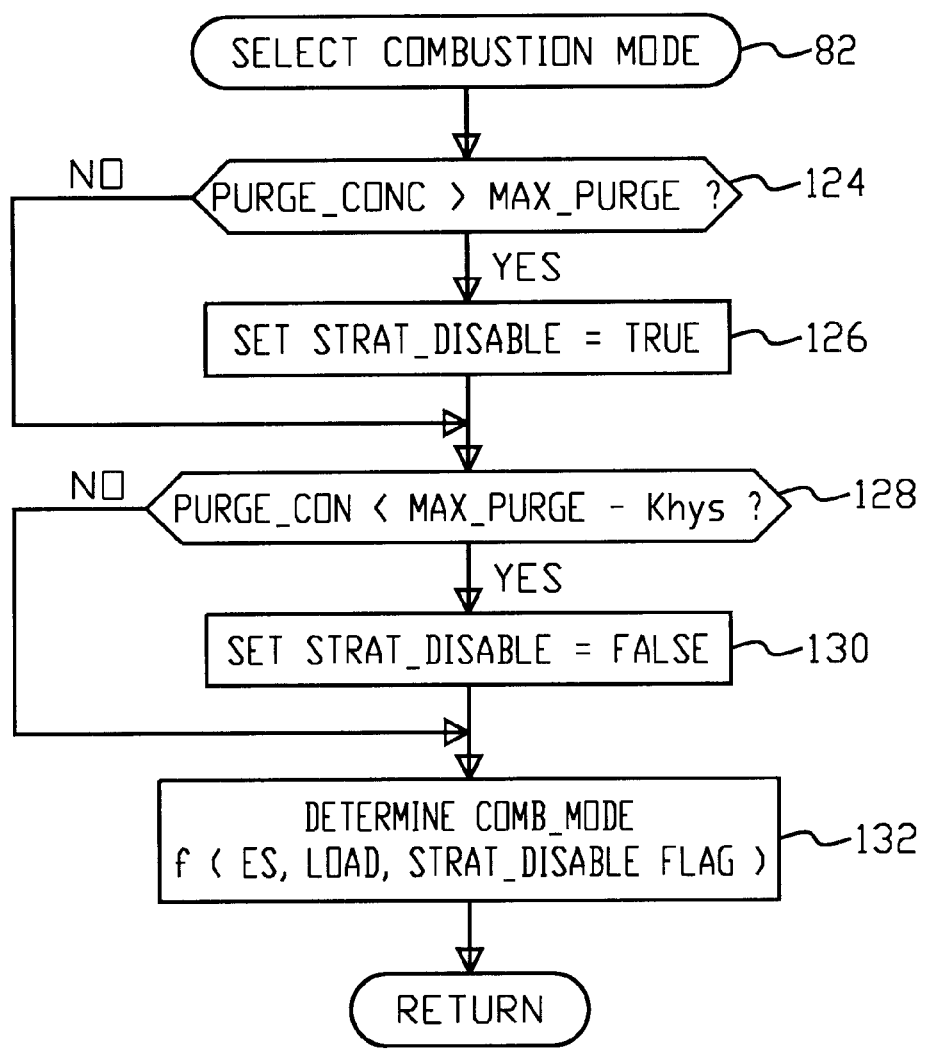

The flow diagram of FIG. 4 details the block 82 of FIG. 2, and concerns selection of the engine combustion mode COMB_MODE. Ordinarily, COMB_MODE is selected based on the engine speed and load (ES, LOAD), as indicated at block 130. According to this invention, however, the blocks 122–128 are first executed to determine the status of a flag (STRAT_DISABLE FLAG) for disabling selection of the stratified mode when the estimated hydrocarbon concentration PURGE_CONC of the purge vapors exceed a threshold MAX_PURGE. The blocks 122 and 124 set the STRAT_DISABLE FLAG to TRUE to disable the stratified mode when PURGE_CONC exceeds MAX_PURGE, and the blocks 126 and 128 set the STRAT_DISABLE FLAG to FALSE when PURGE_CONC falls below (MAX_PURGE-Khys), where Khys is a hysteresis constant. Thus, the engine combustion mode is essentially forced to be homogeneous whenever PURGE_CONC exceeds MAX_PURGE. In such case, the increased vacuum causes the purge consumption to increase dramatically, preventing saturation of the canister 36, and eventually enabling a return to the stratified combustion mode when the PURGE_CONC falls below (MAX_PURGE-Khys).

Figure 5:
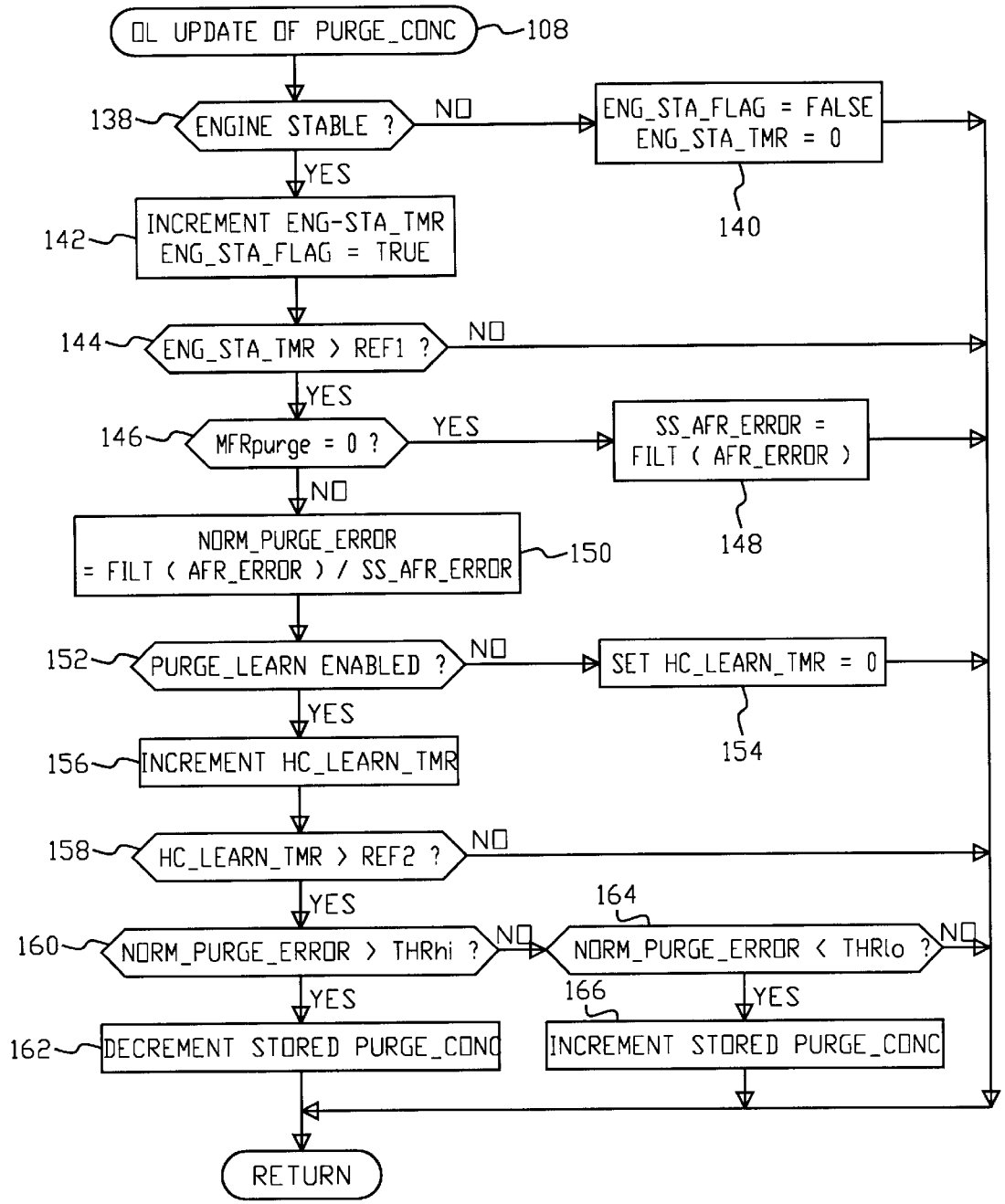

The flow diagram of FIG. 5 details the block 108 of FIG. 2, and concerns updating the estimated hydrocarbon concentration PURGE_CONC of the purge vapor during open-loop fuel control in the stratified combustion mode. The blocks 138–142 determine whether the engine 10 is operating substantially steady-state, and set the state of the ENG_STA FLAG accordingly. The block 138 determines if the engine 10 is operating substantially steady-state. This may be determined, for example, by determining if speed vs. load operating point of engine 10 has been substantially constant for a predetermined interval. If block 138 is answered in the negative, the block 140 sets ENG_STA_FLAG to FALSE, and resets a timer ENG_STA_TMR to zero. If block 138 is answered in the affirmative, the block 142 sets ENG_STA_FLAG to TRUE, and increments ENG_STA_TMR. When the value of ENG_STA_TMR exceeds a reference time REF1, as determined at block 144, the block 146 determines if there is a flow of purge vapor into intake manifold 58. If MFRpurge is zero, the block 148 updates a measure (SS_AFR_ERROR) of the steady-state air/fuel ratio error by updating a running average, or filter, of AFR_ERROR. If there is a flow of purge vapor, the block 150 obtains a running average of the AFR_ERROR, and computes a measure (NORM_PURGE_ERROR) of the air/fuel ratio error due to the presence of the purge vapor by dividing the averaged value of AFR_ERROR with purge flow by SS_AFR_ERROR. This essentially normalizes or compensates the filtered air/fuel ratio error during purge flow for air/fuel ratio error (rich or lean) that existed without purge flow. Under closed-loop fuel control, such normalization is not necessary because the closed-loop corrections obtained from the block learn memory (BLM) in the absence of purge vapor drive the air/fuel ratio to substantially zero. If specified purge learning enable conditions are met for at least a reference time REF2, as determined at blocks 152, 154, 156 and 158, the blocks 160, 162, 164 and 166 increment or decrement the purge hydrocarbon concentration estimate PURGE_CONC for the current speed vs. load operating point of engine 10 based on the value of NORM_PURGE_ERROR relative to upper and lower thresholds THRhi, THRlo. If NORM_PURGE_ERROR exceeds THRhi, the air/fuel ratio is too lean in the presence of purge vapor; this means that the fuel control of block 102 is over-compensating for the purge vapor, and the block 160 is executed to decrement the estimated value of PURGE_CONC. Conversely, if NORM_PURGE_ERROR is below THRlo, the air/fuel ratio is too rich in the presence of purge vapor; this means that the fuel control of block 102 is under-compensating for the purge vapor, and the block 164 is executed to increment the estimated value of PURGE_CONC. The learning enable conditions mentioned in reference to block 150 relate primarily to purge flow, and ensure that there is sufficient purge flow to have a measurable impact on air/fuel ratio.

In summary, the control of the present invention permits accurate fueling and efficient combustion of purge vapors in a direct injection gasoline engine operable in stratified or homogenous combustion modes. The control has several aspects, including accurate estimation of the hydrocarbon concentration of purge vapor during open loop fuel control in the stratified combustion mode, adjustment of the fuel injection quantity based on the estimated concentration and a purge combustion efficiency factor, disabling of the stratified combustion mode based on the estimated concentration relative to a calibrated threshold, determining the allowable percentage of purge vapor based on the selected combustion mode, and controlling the purge flow rate based on the degree to which the estimated concentration exceeds the allowable percentage.

While the present invention has been described in reference to the illustrated embodiments, it is expected that various modification in addition to those mentioned above will occur to those skilled in the art. For example, there may be additional combustion modes, such as a lean or rich air/fuel ratio homogeneous mode, in which case, the control of this invention will schedule PURGE_PCT_LMT for each combustion mode, and will disable all lean combustion modes if PURGE_CONC exceeds the disable threshold MAX_PURGE. Thus, it will be understood that methods incorporating these and other modifications may fall within the scope of this invention, which is defined by the appended claims.

What is claimed is:

1. A method of operation for an internal combustion engine having a fuel vapor purge system that is selectively activated to purge stored fuel vapor into said engine, said engine being operable in a stratified combustion mode where fuel is injected into a cylinder of said engine to produce a lean air/fuel mixture that is combusted with the purged fuel vapor for achieving a commanded engine power output, the method comprising the steps of:

determining a first average air/fuel ratio error when said purge system is not activated and a second average air/fuel ratio error when said purge system is activated;

estimating a concentration of fuel in said purged fuel vapor during steady-state operation of said engine in said stratified combustion mode based on a relationship between said first average air/fuel ratio error and said second average air/fuel ratio error; and adjusting a quantity of fuel injected into said cylinder to compensate for said concentration.

2. The method of operation of claim 1, including the steps of:

normalizing said second average air/fuel ratio error based on said first average fuel ratio error;

increasing said concentration when the normalized second average air/fuel ratio error indicates an excessively rich air/fuel ratio; and decreasing said concentration when the normalized second average air/fuel ratio error indicates an excessively lean air/fuel ratio.

3. The method of operation of claim 2, wherein the step of normalizing said second average air/fuel ratio error includes the step of:

forming a ratio of said second average air/fuel ratio error to said first average air/fuel ratio error.

4. The method of operation of claim 1, including the steps of:

estimating an expected combustion efficiency of the purged fuel vapor; and adjusting said quantity of fuel to compensate for said expected combustion efficiency.

5. The method of operation of claim 4, including the steps of:

measuring an air/fuel ratio of said engine; and estimating said expected combustion efficiency based on said air/fuel ratio.

6. The method of operation of claim 1, wherein said engine is capable of operation in said stratified combustion mode or a homogeneous combustion mode, the method including the steps of:

comparing said concentration to a threshold indicative of a relatively high concentration; and disabling operation of said engine in said stratified combustion mode when said estimated concentration exceeds said threshold.

7. The method of operation of claim 1, wherein said engine is capable of operation in said stratified combustion mode or a homogeneous combustion mode, the method including the steps of:

selecting a combustion mode for said engine;

determining as a function of said combustion mode selected for said engine an allowable percentage of air flow into said cylinder that can be constituted by said purged fuel vapor; and controlling activation of said purge system based on said allowable percentage.

8. The method of operation of claim 7, including the steps of:

comparing a current percentage of said air flow that is constituted by said purged fuel vapor to said allowable percentage; and when said current percentage exceeds said allowable percentage, reducing an activation of said purge system at a determined variable rate to bring said current percentage into correspondence with said allowable percentage.

9. The method of operation of claim 8, wherein said variable rate is determined based on a degree to which said current percentage exceeds said allowable percentage.

10. The method of operation of claim 8, wherein reducing an activation of said purge system includes the steps of:

computing a rate factor according to:

$$(Kfast\_rate * PURGE\_PCT\_LMT/PURGE\_PCT) + [(1 - Kfast\_rate) * Kslow\_rate]$$

where Kfast_rate and Kslow_rate are calibrated rates, PURGE_PCT is said current percentage, and PURGE_PCT_LMT is said allowable percentage; and applying said rate factor to a current activation of said purge system.

* * * * *